(12) United States Patent
Hughes et al.

(10) Patent No.: US 6,212,271 B1
(45) Date of Patent: Apr. 3, 2001

(54) TELEPHONE APPARATUS AND METHOD ADAPTED FOR USE BY IMPAIRED INDIVIDUALS

(75) Inventors: Diane L. Hughes, Lynn Township; Scott Wayne McLellan, Albany Township; Doreen M. Micheletti, Zionsville, all of PA (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/121,643

(22) Filed: Jul. 23, 1998

(51) Int. Cl.[7] ....................................... H04M 1/27
(52) U.S. Cl. .............................. 379/354; 379/368; 379/52
(58) Field of Search .................... 379/354–357, 379/52, 110.01, 368, 216

(56) References Cited

U.S. PATENT DOCUMENTS

| | | | |
|---|---|---|---|
| 4,866,764 | * 9/1989 | Barker, III | 379/355 |
| 4,908,853 | * 3/1990 | Matsumoto | 379/355 |
| 5,440,627 | * 8/1995 | Puri | 379/355 |
| 5,561,712 | * 10/1996 | Nishihara | 379/355 |
| 5,805,694 | * 9/1998 | Kim | 379/354 |

* cited by examiner

*Primary Examiner*—Wing F. Chan
(74) *Attorney, Agent, or Firm*—S. W. McLellan

(57) ABSTRACT

A set of identifiers (for example, the name of a party and the associated telephone number) is stored in the memory of telephone apparatus. Sequential retrieval of the stored identifiers is facilitated by the use of a prominent button that is oversized relative to the size of the buttons of a conventional telephone keypad. Retrieved identifiers are indicated visually, aurally, and/or tactilely. Selection of an indicated identifier initiates a call to the party represented by the identifier.

1 Claim, 5 Drawing Sheets

TELEPHONE APPARATUS AND METHOD ADAPTED FOR USE BY IMPAIRED INDIVIDUALS

TECHNICAL FIELD

This invention relates to telephone apparatus and, more particularly, to a telephone apparatus and method adapted for ease of use by impaired individuals.

BACKGROUND OF THE INVENTION

For the visually or physically impaired, accurately dialing a standard telephone may be difficult. For example, distinguishing among and accurately actuating the relatively small twelve-button keypad buttons of a standard telephone is a challenging task. Certain techniques such as conventional speed dialing are available in telephone apparatus, but since they generally involve use of the relatively small keypad buttons or other similarly sized small buttons, these techniques are also of limited use to the impaired. Even complete keypads composed of relatively large buttons present difficulty in distinguishing among the multiple buttons. Moreover, automatic dialers typically have a relatively small number of distinguishable buttons, therefore they tend to limit the caller to a correspondingly small number of parties to be called.

SUMMARY OF THE INVENTION

The present invention ameliorates these problems. The invention provides new apparatus designed for ease of use by impaired individuals. This apparatus comprises a medium for storing both the telephone number of the party to be called and a description associated with each telephone number (for example, the name of the party). This combination of information will hereinafter be referred to as the identifier. Further, the apparatus includes a processing unit that manipulates (for example routes, compresses, etc.) the identifier and a prominent instrumentality (for example, at least one oversized button) for sequentially retrieving the stored identifiers. The apparatus also comprises an element responsive to each retrieval of a part of a stored identifier (for example, the description) for indicating (for example, audibly) the retrieved part of the identifier. The apparatus may further comprise a switch that selectively connects between a phone line, standard parts of a telephone set, and the processing unit. Finally, the apparatus comprises a way for selecting and initiating a call to a party whose identifier was retrieved.

The inventive apparatus can either be incorporated as an integral part of an otherwise standard telephone set or be connected to a standard set as an adjunct device. In either configuration, the critical functions are provided by a suitably programmed standard processing unit.

Also, the invention provides a method, designed for ease of use by impaired individuals, for storing and retrieving identifiers. In particular, the method comprises storing in a memory at least one identifier representing a party to be called, and then retrieving the stored identifier from memory in response to the activation of at least one prominent instrumentality. Further, the method comprises indicating each retrieved identifier. Finally, the method comprises responding to selection of the retrieved identifier by initiating a call to the party corresponding to the retrieved identifier.

BRIEF DESCRIPTION OF THE DRAWING

The invention will be more fully understood from the following detailed description taken in connection with the accompanying drawing, in which.

DETAILED DESCRIPTION

In accordance with the principles of the present invention, a prominent instrumentality is utilized to select the identifier of a party to be called and then initiate a call. In particular, the instrumentality is designed for ease of use by an impaired individual.

As used herein, the term prominent means having the characteristic that it should be readily recognizable by the intended user as different from other parts of telephone apparatus in one or more of the following: size, color, shape, or location in the apparatus. The different characteristics are chosen to be particularly appropriate to the specific class of impaired individuals.

Illustratively, the prominent instrumentality is designed to be integrated into an otherwise standard telephone set, or to function as part of an adjunct device that is connected to a standard telephone set. In either case, the instrumentality comprises, for example, a button that is oversized relative to the size of each button of a conventional twelve-button telephone keypad.

Figure 1:
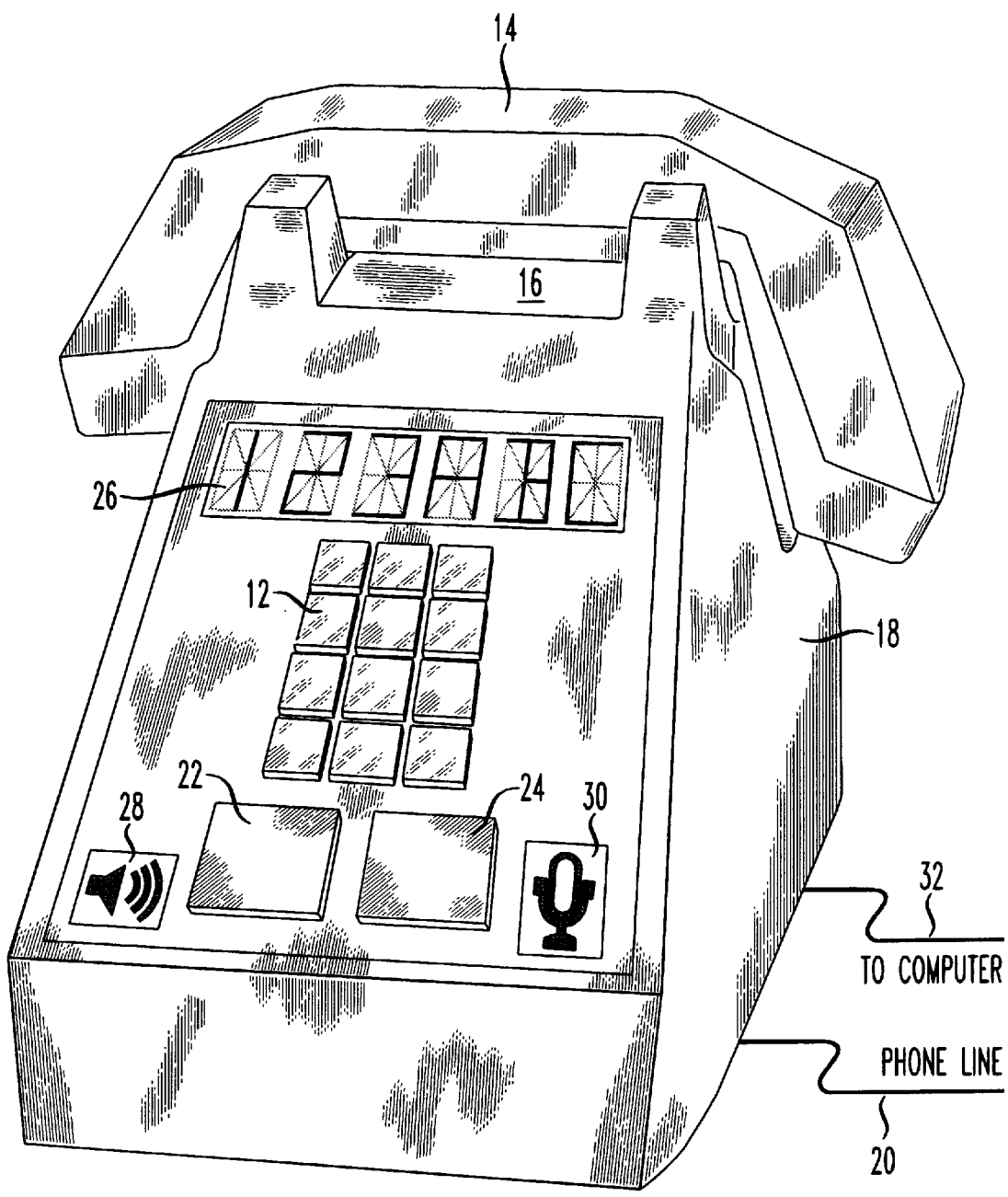
FIG. 1 represents in simplified form an illustrative embodiment of the invention.

FIG. 1 shows a standard telephone set modified to constitute a particular illustrative embodiment of the invention. The modified set 10 includes standard features of a conventional telephone set, including, for example, a typical twelve-button keypad 12, and a handset 14 resting in a cradle 16 that is integral with a housing 18. As shown, the set 10 is connected to a standard telephone line 20.

The buttons of the typical keypad 12 are relatively small and closely packed together. Moreover, typically, they are all substantially identical in physical size and shape. Thus, the standard buttons are not easily selected with accuracy by a person with visual or some types of physical impairment.

For example, each of the buttons included in the keypad 12 of FIG. 1 is typically only about one square centimeter ($cm^2$) in area. And the entire twelve-button keypad 12 is typically packed into an area of only about thirty $cm^2$.

In the particular illustrative embodiment of FIG. 1, the aforementioned prominent instrumentality comprises, for example, two relatively large buttons 22, 24. By way of example, each of the prominent buttons 22, 24 is substantially larger than any of the conventional keypad buttons. Illustratively, the buttons 22, 24 are each approximately five times as large in area as each of the keypad buttons. Accordingly, distinguishing between the buttons and actuating them is relatively easy even for impaired individuals. In alternative embodiments, as described below, one button is sufficient.

The prominence of the buttons 22, 24 can be enhanced in a number of ways. Thus, for example, the buttons 22, 24 can be contoured (for example, in shape and height), colored, textured, illuminated, marked in Braille, embossed, or designed in other ways to enhance their prominence and hence facilitate their use. Also, the buttons 22, 24 are advantageously located in an easily accessible position.

The button 22 of FIG. 1 is used by a caller to retrieve, in sequence, a part of the identifier (for example, the description of the party to be called) that was previously stored in memory, as will be described in detail below. Each part of the retrieved identifier is indicated to the caller. For example, each part of the retrieved identifier may be indicated via a display 26, an audio speaker 28 in the housing 18, through the standard handset 14 or any combination thereof. Illustratively, the display 26 can provide either a visual or tactile (for example, Braille) indication.

The telephone set 10 shown in FIG. 1 may also include a conventional microphone 30 and/or a connection 32 to an associated computer. The use of these components will be described in detail below.

Figure 2:
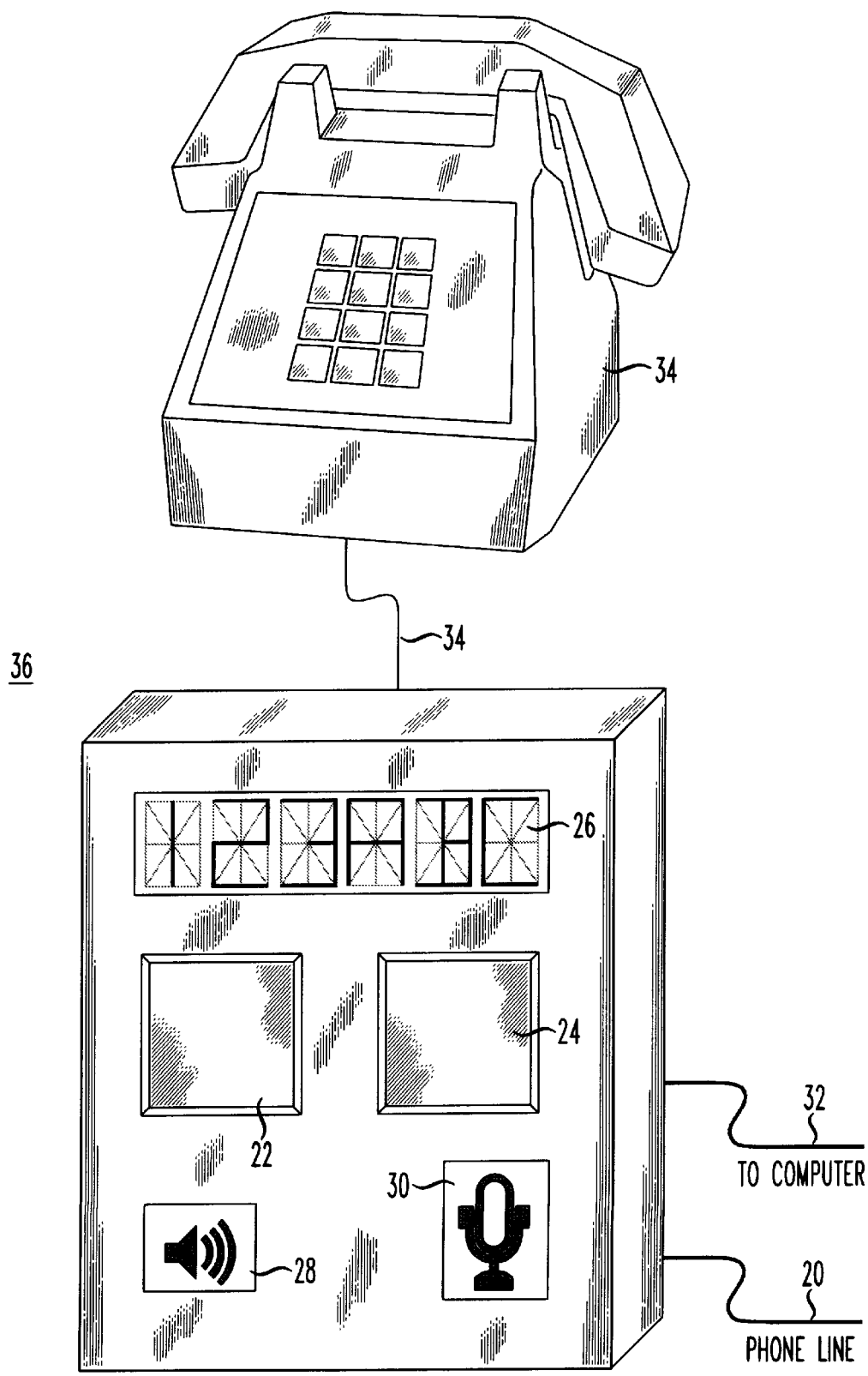
FIG. 2 represents another illustrative embodiment of the invention.

FIG. 2, which represents another illustrative embodiment of the invention, shows an unmodified conventional telephone set 34 linked (for example, via an electrical lead 35) to a self-contained adjunct unit 36. As shown, the adjunct unit 36 includes, for example, some of the same elements shown in FIG. 1 and described above. Thus, the previously specified buttons 22, 24, the indicator 26, the speaker 28, the microphone 30, the telephone line 20, and computer connection 32 are also depicted in FIG. 2 and identified by the same reference numerals utilized therefor in FIG. 1.

Figure 3:
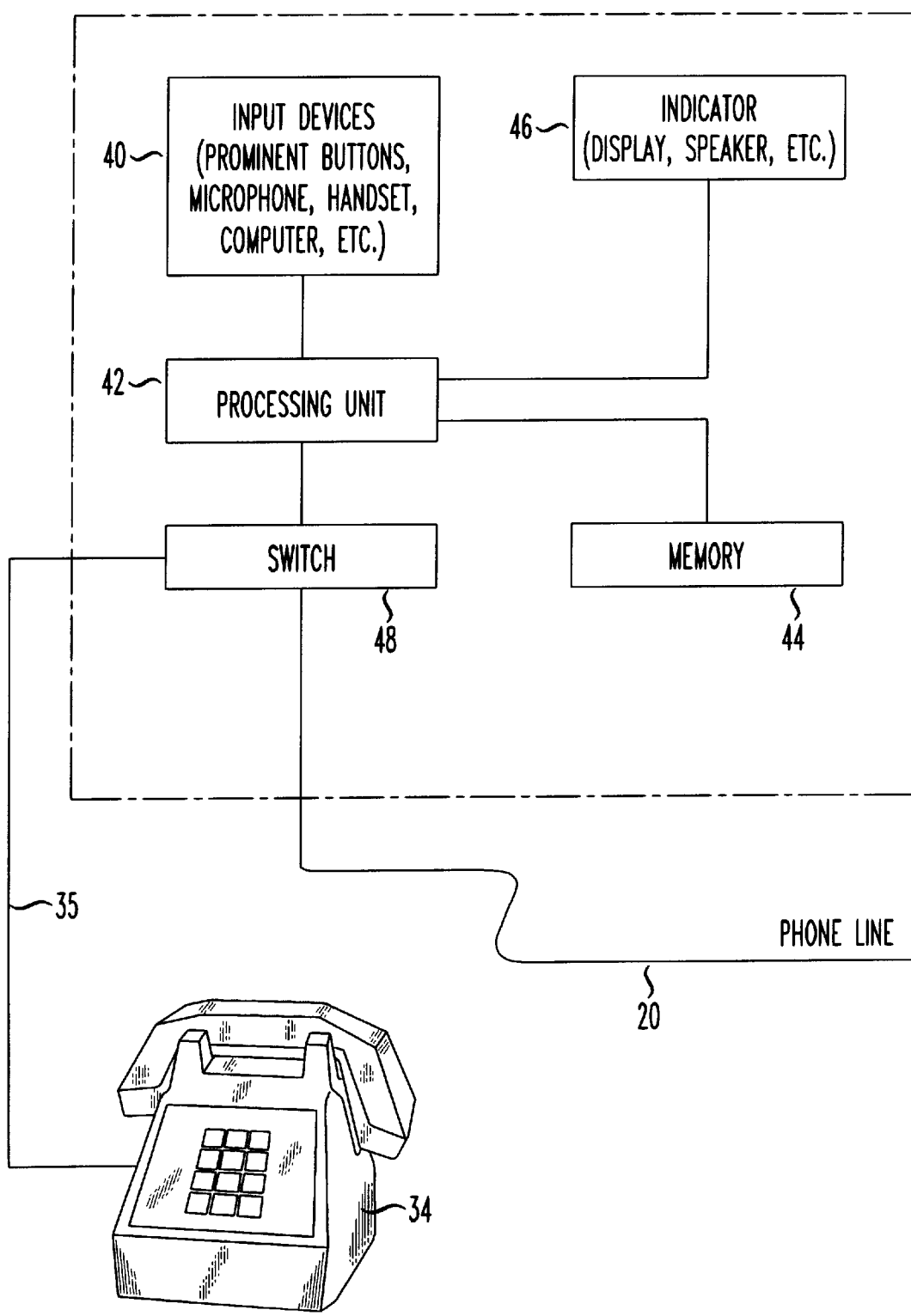
FIG. 3 is a block diagram showing equipment designed to be included in the FIG. 1 embodiment or in the adjunct device of the FIG. 2 arrangement.

The interconnected components shown within the dash-line box 38 of FIG. 3 represent a specific illustrative system embodying the principles of the present invention. This system is designed to be included either within the housing 18 of FIG. 1 or in the adjunct unit 36 of FIG. 2.

Identifiers to be stored in the system 38 of FIG. 3 are provided, for example, via one or more input devices 40. As indicated earlier, these input devices may include the previously described prominent buttons 22, 24, the microphone 30 or an associated computer. Additionally, identifiers to be stored may also be provided via the telephone line 20 through the switch 48 to the processing unit 42. Further, identifiers may be supplied to the system 38 by the standard telephone set 34 via the link 35 and then through the switch 48 to the processing unit 42.

Identifiers provided by one or more of the above-described input devices are processed in unit 42 and routed for storage in a memory 44. If desired, the inputted identifiers may also be routed by the unit 42 to an indicator 46. In that way, each inputted identifier may be checked (for example, visually, aurally or tactilely) for correctness. By way of example, this indication may be presented on the display 26 or through the audio speaker 28, as shown in FIGS. 1 and 2.

Illustratively, the processing unit 42 of FIG. 3 comprises a standard digital signal processor (DSP), possibly in combination with a conventional microprocessor. Together, these standard components are programmable in known ways to perform in the indicated system 38 a variety of conventional individual functions, such as routing, signal processing (for example, bidirectional translation of audible tones to digital form, data compression and decompression), control of a switch 48, and driving of the indicator 46. In particular, as described below, the processing unit 42 enables the specific steps represented in FIGS. 4 and 5 to be performed.

The switch 48 of FIG. 3, which is controlled by the processing unit 42, is designed to selectively interconnect specified components. Thus, for example, the switch 48 is adapted: 1) to connect the telephone set 34 through the link 35 to the telephone line 20, 2) to connect the processing unit 42 to the telephone line 20, or 3) to connect the telephone set 34 to the processing unit 42.

The switch 48 is a standard unit. It may comprise, for example, conventional relays, or it may be implemented with conventional electronic circuitry. The switching function us used during the input phase as described above and the retrieval and selection phase as will be described below. Alternatively, the switching function may be directly carried out by the processing unit 42 itself.

Figure 4:
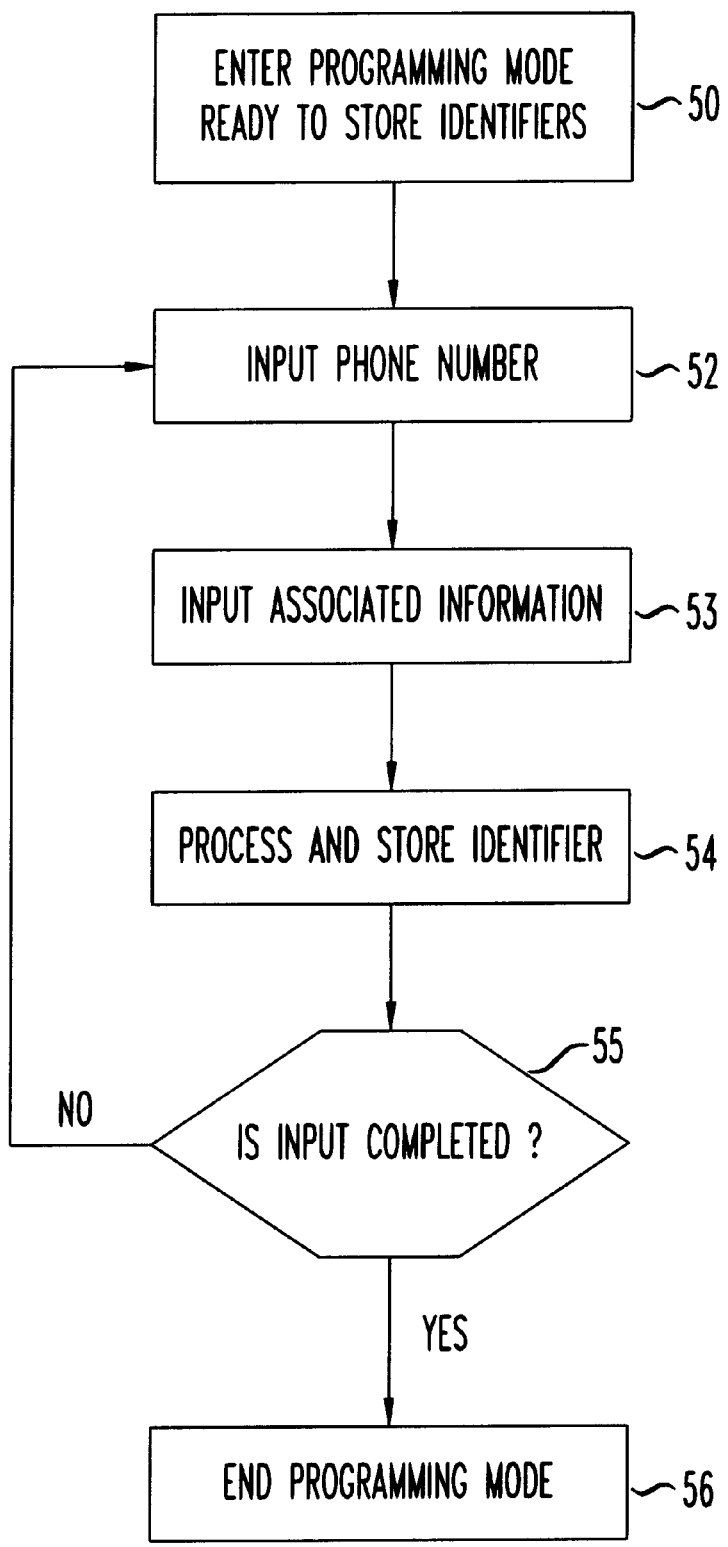
FIG. 4 is a flowchart showing one illustrative way for inputting information into the embodiments shown in FIGS. 1 and 2.
Figure 5:
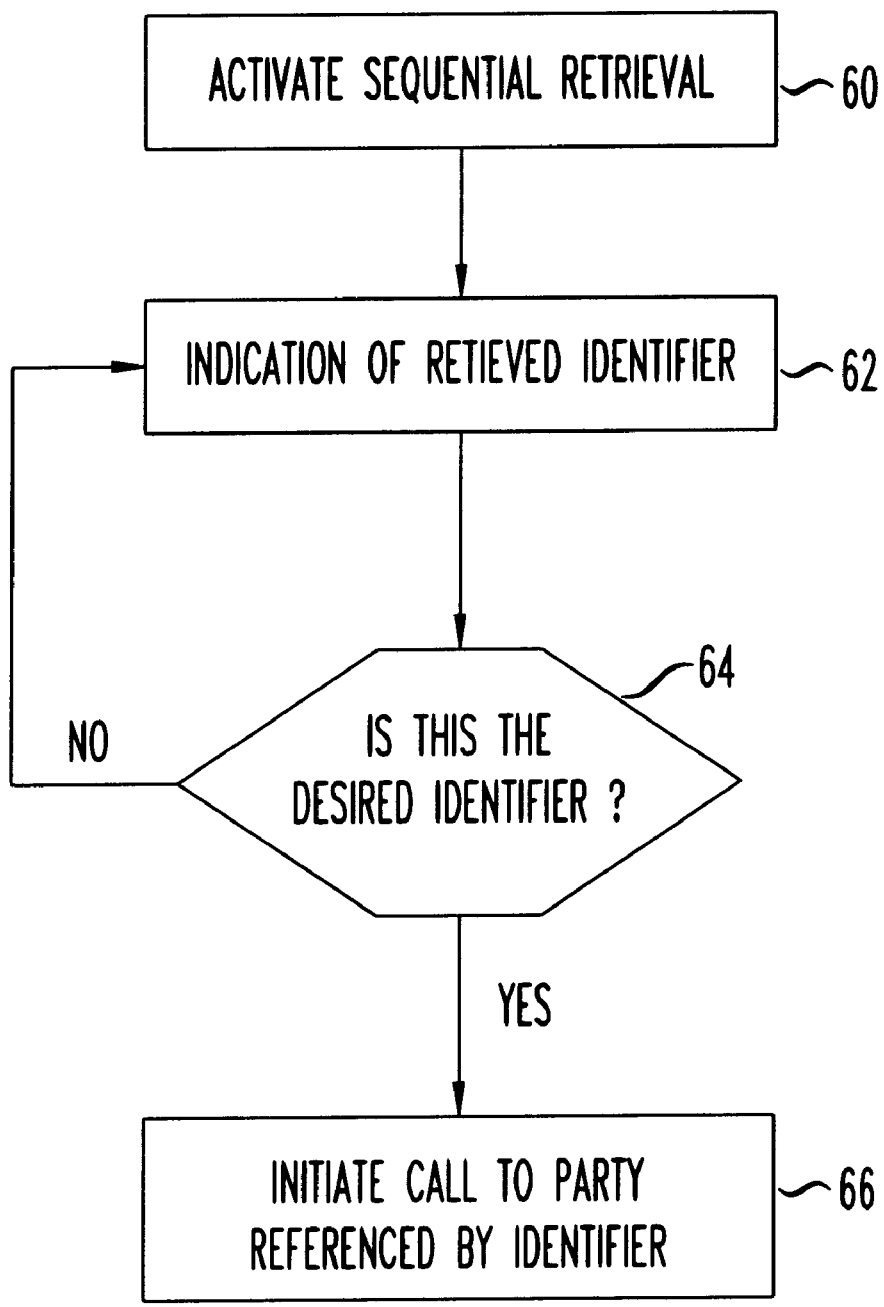
FIG. 5 is a flowchart illustrating the overall operation of the depicted systems.

The process of inputting and storing identifiers in the system 38 of FIG. 3 is illustrated by the step-by-step diagram of FIG. 4. Various ways of initiating the inputting process (represented by box 50) are available. By way of example, the process can be started by simultaneously depressing both of the prominent buttons 22, 24 shown in FIGS. 1 and 2. Other exemplary ways include: 1) depressing and holding down only one of the prominent buttons 22, 24 for a minimum specified time, 2) successively pressing one of the prominent buttons 22, 24 twice within a specified period of time, 3) recognizing an initiation signal from the telephone line 20 or from the associated computer, or 4) depressing a separate and distinct button (not shown in FIGS. 1 and 2).

Advantageously, in response to the initiation of the inputting process, the processing unit 42 of FIG. 3 supplies signals to an indicator that inputting may commence. For example, such signals may be sent to the indicator 46 (for example, a visual, tactile, or aural display) or to the handset of the telephone set 34 via the switch 48.

Inputting of the identifier is then carried out in one of the above described ways. Illustratively, each identifier comprises the phone number of a party to be called and a description of the party to be called (for example, the party's name). Boxes 52 and 53 in FIG. 4 represent this inputting process.

More specifically, actual inputting of identifiers may be carried out in a variety of ways. For example, numbers may be inputted via the standard twelve-button keypad 12 or via signals from the telephone line 20 or the computer line 32. Advantageously, information to be associated with the inputted number can also be entered via the microphone 30, the handset 14, the computer line 32, or the telephone line 20. Upon completion of the inputting of each identifier, the data representing the identifier is processed by the unit 42 and then routed to be stored in the memory 44 of FIG. 3, as indicated by box 54 in FIG. 4.

After an identifier has been stored, the inputter (for example, user, computer or telephone line) either begins the inputting of another identifier or signals that the inputting process has been completed. Completion can be signaled in any of the previously described ways in which inputting was initiated. These steps in the process are represented by boxes 55, 56 and 52 in FIG. 4.

Finally, after a prescribed number of identifiers has been inputted and stored, the depicted system is ready for use. Of course, either before or after inputting a set of identifiers as described above, the system shown in the drawing may be operated as a conventional telephone set by actuating the standard keypad buttons.

To commence sequential retrieval of stored identifiers, the user may, for example, simply depress button 22, of FIGS. 1 and 2, once. This initiation or activation is represented by box 60 in FIG. 5. In response thereto, the processing unit 42 of FIG. 3 retrieves from the memory 44 one of the stored identifiers. The order in which the stored identifiers are retrieved may be pre-established. For example, retrieval order may be first-in/first-out (FIFO) or last-in/first-out (LIFO).

The data representing a retrieved identifier is then processed by the unit 42 (FIG. 3), and at least a part of the identifier is router by the unit 42 to the indicator 46 or to the telephone set 34 via the switch 48. This step in the process is represented by box 62 in FIG. 5. Consequently, either the entire retrieved identifier, or a part thereof, may be visually, tactilely or aurally displayed.

In response to the indicated identifier, the user either selects this identifier and thereby initiates a call to the indicated party, or retrieves another stored identifier. These steps in the process are represented by boxes 64, 66 and 60 in FIG. 5. Thus, for example, placing a call to the indicated party may be accomplished by actuating the prominent button 24 of FIGS. 1 and 2. Or retrieval of another stored identifier may be initiated by again depressing the prominent button 22 or by holding down button 22, which may allow for cycling through the stored identifiers.

Various alternative ways of performing the above specified retrieval, selection and calling functions are feasible. By way of example, the selection and calling function may be initiated simply by lifting the handset 14 from the cradle 16 of FIG. 1. In that arrangement, the prominent button 24 may be omitted. The inclusion of only a single prominent button in the herein considered apparatus may be advantageous in that a single, easily distinguishable and activateable instrumentality is thereby provided. In the manner described above, such a single prominent button could, for example, also be used both for inputting identifiers and to initiate sequential retrieval of identifiers.

In response to receipt of an indication from the user that the indicated call is to be initiated, the processing unit 42 of FIG. 3 controls system interconnections and directs generation of signals representative of the selected number to be called. In turn, these signals are applied to the telephone line 20 through the switch 48. Thereafter, the telephone set 10 operates in a standard fashion.

Finally, it is to be understood that although the invention is disclosed herein in the context of particular illustrative embodiments, those skilled in the art will be able to devise numerous alternative arrangements. Such alternative arrangements, although not explicitly shown or described herein, embody the principles of the present invention and are thus within its spirit and scope. Thus, for example, although primary emphasis herein has been directed to buttons as the prominent instrumentality, other prominent elements such as easily distinguishable levers, switches, etc. may be employed. Further, if desired, provision can be made for departing from the normal retrieval sequence described above. For example, in an emergency situation, a call to a pre-selected stored number can be initiated simply by rapid successive depressions of the herein-described prominent instrumentalities.

We claim:

1. A telephone apparatus including a multiple button keypad dialer comprising:

a memory for storing at least one identifier for each party to be called;

a prominent instrumentality distinguishable from any of said keypad buttons;

a processing unit, responsive to the prominent instrumentality, for retrieving at least a portion of at least one identifier from the memory;

an indicator responsive to the retrieved identifier;

a selector; and a switch for connecting and disconnecting said standard telephone set elements and said telephone line, for connecting and disconnecting said processing unit and said standard telephone set elements, and for connecting and disconnecting said processing unit and said telephone line;

wherein the processing unit initiates a call to the party corresponding to the retrieved identifier in response to the selector.

* * * * *